United States Patent [19]

Matsuoka et al.

[11] Patent Number: 4,701,784
[45] Date of Patent: Oct. 20, 1987

[54] PIXEL DEFECT CORRECTION APPARATUS

[75] Inventors: Hiroki Matsuoka, Takatsuki; Atsushi Morimura, Nara; Yoshinori Kitamura, Takatsuki, all of Japan

[73] Assignee: Matsushita Electric Industrial Co., Ltd., Kadoma, Japan

[21] Appl. No.: 829,135

[22] PCT Filed: May 30, 1985

[86] PCT No.: PCT/JP85/00300

§ 371 Date: Jan. 31, 1986

§ 102(e) Date: Jan. 31, 1986

[87] PCT Pub. No.: WO85/05752

PCT Pub. Date: Dec. 19, 1985

[30] Foreign Application Priority Data

Jun. 1, 1984 [JP] Japan ............................. 59-113337
Dec. 17, 1984 [JP] Japan ............................. 59-265749

[51] Int. Cl.$^4$ ............................................. H04N 3/14
[52] U.S. Cl. ................................ 358/213.17; 358/163
[58] Field of Search ............... 358/213, 212, 163, 167

[56]  References Cited

U.S. PATENT DOCUMENTS 4,167,754  9/1979  Nagumo et al. .................. 358/213
4,237,488  12/1980  Takemura ......................... 358/163
4,470,065  9/1984  Reitmeier ......................... 358/163
4,517,600  5/1985  Reitmeier ......................... 358/163

FOREIGN PATENT DOCUMENTS 54-122923  9/1979  Japan .
54-124627  9/1979  Japan .
54-124628  9/1979  Japan .

OTHER PUBLICATIONS

S. Sakai et al.; Technical Report of the Institute of Television Engineers of Japan (Television Gakkai Gijutsu Houkoku, vol. 7, No. 14, pp. 19-24); "Development of Defect Compensator for CCD".

Primary Examiner—Gene Z. Rubinson
Assistant Examiner—Stephen Brinich
Attorney, Agent, or Firm—Cushman, Darby & Cushman

[57] ABSTRACT

A defect correction apparatus includes a memory having information of image failure of a solid state imaging device, a coincidence detection circuit for detecting a position of pixel having a failure at the time of image pick up, and a failure correction circuit. The failure correction circuit includes structure for producing plural signals for correction of signals of pixels around the pixel having the failure, and structure for selecting an optimum one from the produced plural signals, for correction responding to condition of the image and signals of the pixel therearound, and to use the selected optimum signal for correction by switching for the signal of the failure pixel.

12 Claims, 21 Drawing Figures

PIXEL DEFECT CORRECTION APPARATUS

TECHNICAL FIELD

The present invention relates to a defect correction apparatus of a solid state imaging device or the like.

BACKGROUND ART

In recent years, video cameras utilizing solid state imaging devices have entering into practical use. However, the solid state imaging device is extremely expensive, since the production yield of the solid state imaging device, is low. This is because the degree of integration is high, chip area are large and signals to be handled is analog signals, are low. This therefore, is a great obstacle against popularization of video cameras using the solid state imaging device.

Also, when there are picture defects such as white dots or black dots, it is necessary to correct the defects in a signal processing circuit.

Hereafter, the defect correction apparatus of the prior art is elucidated. This example is reported in the Technical Report of the Institute of Television Engineers of Japan (Television Gakkai Gijutsu Houkoku Vol. 7, No. 14, pages 19-24).

Figure 1:
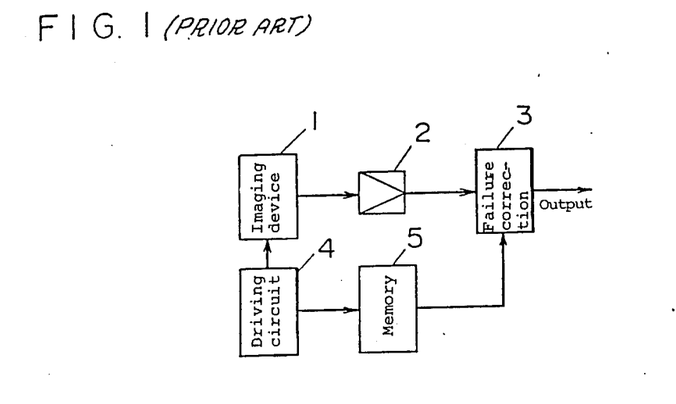
FIG. 1 is a block diagram showing the conventional defect correction apparatus.

FIG. 1 shows a block diagram of the defect correction apparatus of this prior art, which includes solid state imaging device 1, pre-amplifier 2, defect correction circuit 3, driving circuit 4 and memory 5.

The operation of this conventional imaging apparatus is elucidated in the following. A signal from the imaging device 1 is amplified by the pre-amplifier 2 to a predetermined level. Those parts of the amplified signal from pixels that contain defects produced by failures of the imaging device are converted by a defect correction circuit 3 into a signal which does not include a defect. This converted signal is used as an input to the next processing circuit. Judgement of whether the input signal includes the defect or not is carried out by using data stored in a memory 5 (recording circuit) which shows the position of defects.

Figure 2:
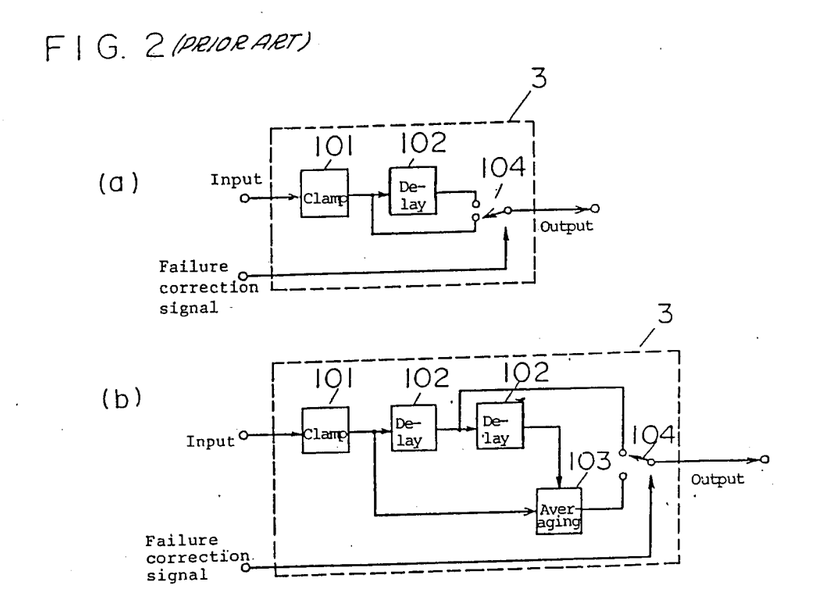

Details of the signal processing relating to the defect correction are elucidated referring to FIG. 2. The imaging signal, after the defect correction, is converted into necessary principal color signals R (red color signal), G (green color signal) and B (blue color signal), and is output after conversion, for instance, as an NTSC signal. A method shown in FIG. 2 is used. As the defect correction method Numeral 101 is a clamp circuit, 102 is a delay circuit and 103 is an averaging circuit. The method of FIG. 2(a) performs defect correction using making a substitution by a signal which is prior to the signal in which the defects are arising. FIGS. 3(a) and (b) show methods of switching-over.

Figure 3:
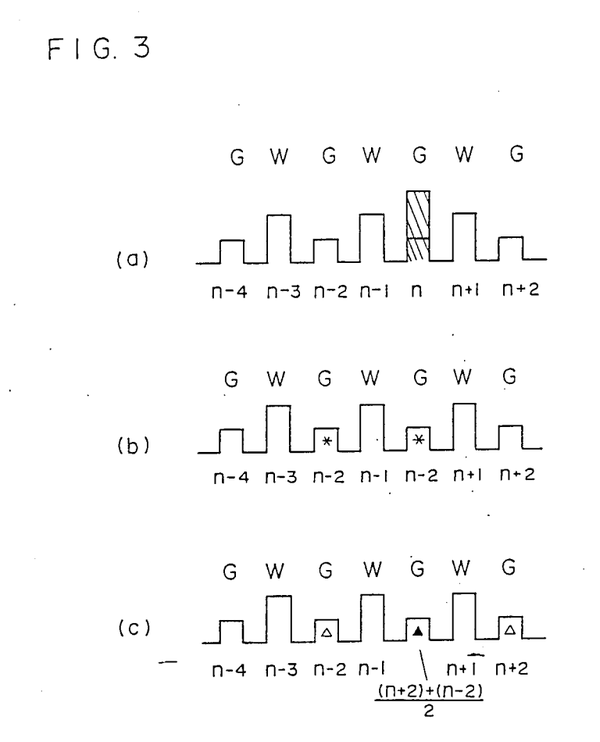

A signal of n-th order shown by hatching in FIG. 3(a) is a signal containing a failure such as the described defect. The n-th position is preliminarily stored in the memory 5 as the failure signal, and in compliance with scanning of the imaging device, the failure correction signal is sequentially output. When the failure correction signal is output, it is switched for the n−2-th signal which has no failure such as the defect, by the switching 104. This yields a signal as shown in FIG. 3. FIG. 2(b) shows a similar correction apparatus. This uses a method, such that when a failure correction is necessary, an averaging processing is made by using signals before and after the picture element. FIG. 3(c) shows this situation. A signal of $\frac{1}{2}\{(n-2)+(n+2)\}$-th signal used. The signal shown by Δ is the signal substituted for the signal of nth order (that contains the errors).

However, the above-mentioned conventional constitution has a problem that errors are produced corresponding to kinds of pictures picked up or changes in the pictures, thereby to lower the picture quality, since signal after making correction of a failure such as defect is corrected by using signals of positions of the same relations for all picked up pictures.

DISCLOSURE OF THE INVENTION

The present invention has a purpose of enabling better and best corrections responding to kinds and changes of pictures picked up, in correcting the picture failure of the solid state imaging device; and the best picture is obtained by making plural number of different signals by using signals of pixels of plural number which are around a pixel of object of correction, and constituting such that one best signal responding to necessity among the thus produced signals is selected, and the above-mentioned selected signal is used in place of the signal of the pixel of the object of the above-mentioned correction, and the best corrections for the surrounding pixels responding to conditions of the picture picked up is made.

BRIEF DESCRIPTION OF THE DRAWING

FIGS. 2(a) and (b) are block diagrams showing constitution of the conventional failure correction circuit;

FIGS. 3(a), (b) and (c) are drawings showing relations of signals at failure correction time;

DESCRIPTION OF THE PREFERRED EMBODIMENT

Figure 4:
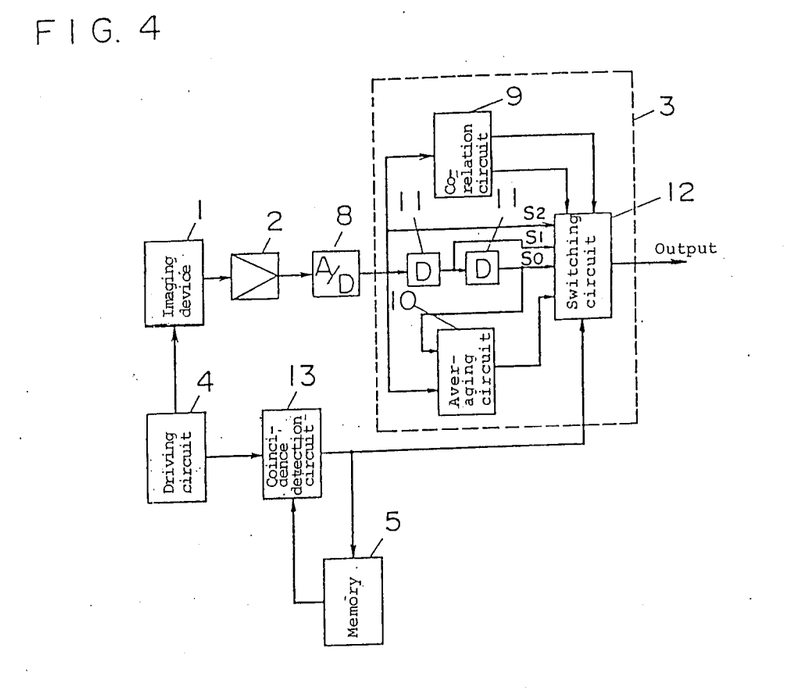
FIG. 4 is a block diagram showing constitution of a defect correction apparatus in accordance with a first embodiment of the present invention.

FIG. 4 shows a block diagram of a defect correction apparatus in accordance with a first embodiment of the present invention. FIG. 4, includes imaging device 1, is a pre-amplifier 2, A/D converter 8, correlation circuit 9, averaging circuit 10, delay circuit 11, switching circuit 12, coincidence detection circuit 13, driving circuit 4 and recording circuit 5 (memory).

Hereafter the operation of the defect correction apparatus of the present embodiment is elucidated.

A signal from the imaging device 1 is amplified to a predetermined level, band-limited by a preamplifier 2 and converted to a digital signal by the A/D converter 8. The converted signal is then delayed by the delay circuit 11 by the extend of n pixels where n is an integer. In this example n=2, since the signals for the same color appear for every other pixel as a result of the color filter arrangement. A signal of timing of $T_0$, $T_1$ and $T_2$ is obtained. In the correlation circuit 9, correlation coefficients for signals $S_0$—$S_2$ for $T_0$—$T_2$ are found as:

$$\rho_f = \frac{\overline{S_0 \cdot S_1}}{\sigma^2}$$

$$\rho_b = \frac{\overline{S_1 \cdot S_2}}{\sigma^2}$$

$\rho$: correlation coefficient
$\sigma^2$: average signal power  (1)

$\rho_f$: a correlation coefficient between a signal $S_0$ for a pixel which is preceding by one and a signal $S_1$ of the pixel taken as the object, $\rho_b$: a correlation coefficient between a signal $S_2$ for a pixel which is following by one and a signal $S_1$ of the pixel taken as the object.

Figure 6:
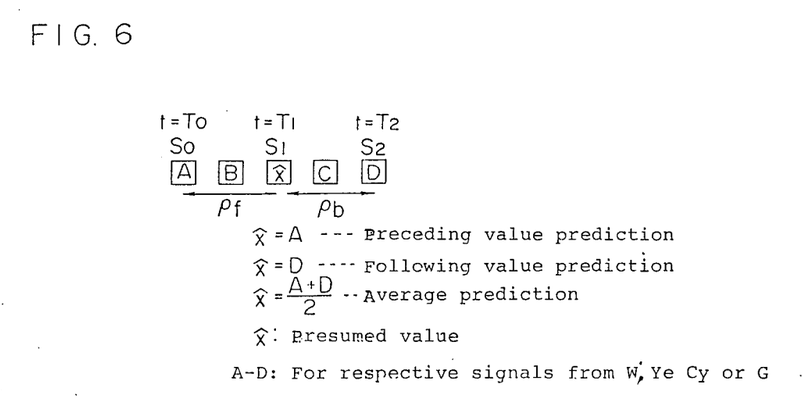
FIG. 6 is a drawing showing arrngement of respective pixels, kinds of predictions and correlation coefficients.

Relation between the pixel position and respective coefficients are shown in FIG. 6. The signal of the upper or lower scanning line is used as the $S_1$ value for calculating the correlation coefficient.

By using the above-mentioned correlation coefficients, correction of a failure such as a defect is made. The correction is made by controlling the circuit in such a manner that the power of the average predicted error $\overline{\epsilon^2}$ becomes minimum, by predicting and presuming the signal of the failure part.

Hereupon, the power of average predicted error $\overline{\epsilon^2}$ is a mean square value of a difference signal between a true value S of a signal of an object pixel, and a value $\hat{x}$ which is made by predicting and presuming the true value, and can be represented as:

$$\overline{\epsilon^2} = \overline{(S-x)^2}.$$

In this first embodiment, by using the so called pre-positioned prediction and post-positioned prediction or the average prediction, the power of the average presumed error $\overline{\epsilon^2}$ becomes minimum.

Here, the prepositioned prediction is such a predicting method that the presumed value $\hat{x}$ of the signal of the object pixel is obtained by multiplying a prediction coefficient "a" by the signal $x_f$ of the preceding pixel, as:

$$\hat{x} = ax_f,$$

and similarly, the post positioned prediction is such prediction method that by using a signal $x_b$ of the next pixel, obtaining as:

$$\hat{x} = ax_b.$$

Furthermore, the average prediction is a predicting method given as:

$$\hat{x} = \tfrac{1}{2}a(x_f + x_b).$$

Wherein, as a result of the color filter disposition, when the same signals appear every n pixels, a signal for the preceding and the next to the object pixel becomes a signal of (n+1) pixel before and signal of (n+1) pixel after.

When the power of the average predicted error $\overline{\epsilon^2}$ becomes minimum, the prediction coefficient "a" becomes equal to the correlation coefficient $\rho$.

The average error power of the pre-positioned prediction or the post-positioned prediction is $$\epsilon_1^2 = 2\sigma^2(1-\rho) \qquad (2),$$

The average prediction error power of the average prediction is $$\epsilon_2^2 = \frac{\sigma^2}{2}\{3 - 2(\rho_f + \rho_b) + \rho_f \cdot \rho_b\}. \qquad (3)$$

Accordingly, the condition of the switching from the average prediction to the prepositioned prediction or the post-positioned prediction is $\overline{\epsilon_2^2} > \overline{\epsilon_1^1}$, and the condition becomes as follows:

In case of $\rho_f > \rho_b$,
the pre-positioned prediction is given, when
$\rho_b < \frac{3}{2-\rho_f} - 2$, and
In case of $\rho_b > \rho_f$,
the post-positioned prediction is given, when
$\rho_f < \frac{3}{2-\rho_f} - 2.$  (4)

As mentioned above, the average prediction error power is made minimum by switching the prediction value of the failure parts by the switching circuit 12 by using the correlation coefficient value. Furthermore, when there is no failure such as a defect, the switching is made by the switching circuit 12 to a signal whereof no correction is to be made. Judgement whether it is a failure part or not, is made by preliminarily storing data in the recording circuit 5 (memory). By referring to the data, a judgement is made such that when the scanning data of the imaging device and the data of the failure part agrees, it is the failure part.

As above-mentioned, by correcting for the failures of the imaging device and by switching so as to make the average prediction error power after the correction to be minimized, a lowering of picture quality for the whole picked up image can be made smallest This enables effective use of solid state imaging device containing a failure, and hence enables a great decrease of cost of the imaging apparatus using the solid state imaging device which hitherto has been expensive due to its poor production yield.

Hereafter, a second embodiment of the present invention is elucidated with reference to the drawing.

Figure 7:
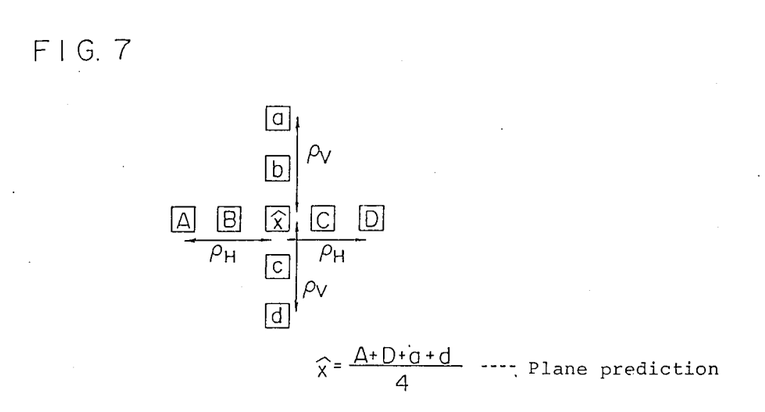
FIG. 7 is a drawing showing pixel arrangement and correlation coefficients in plane prediction.
Figure 8:
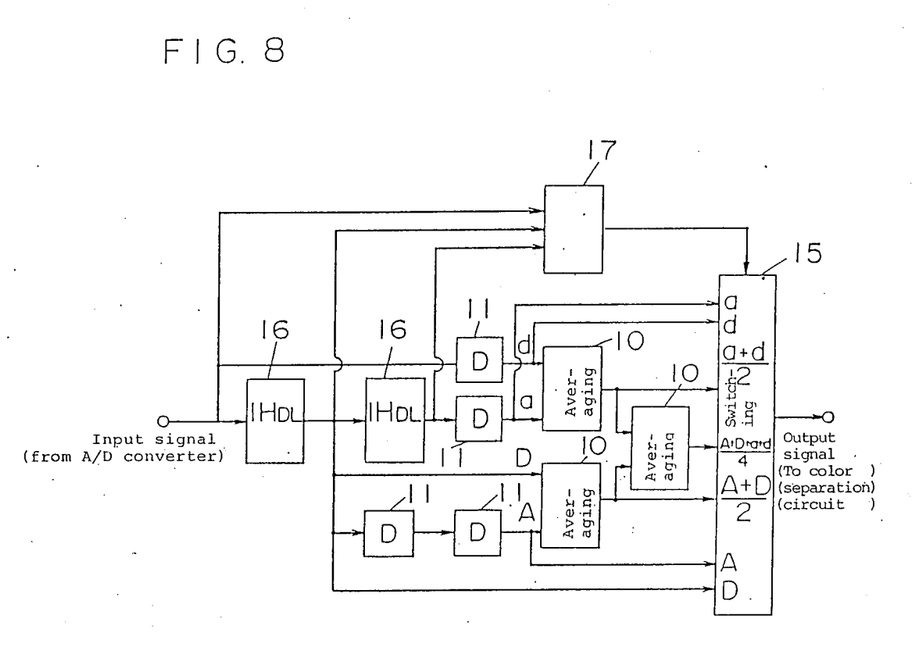
FIG. 8 is a block constitution diagram of a second embodiment of defect correction apparatus in accordance with the present invention.

FIG. 7 is a drawing showing positional relation of signals to make a correction of the second embodiment of the present invention. Differences from the first embodiment of the present invention shown in FIG. 6 is that the correction of signal is extended to the vertical direction of the image. The actual circuit constitution is shown in FIG. 8. Numeral 16 is 1-horizontal period delay circuit, 17 is a correlation circuit, 15 is a switching circuit, 11 is a delay circuit, and 10 is an average circuit. In the second embodiment of the present invention, an averaging of four points can be made, and a plane prediction is possible.

Hereupon, the plane prediction is a prediction method that the predicted value $\hat{x}$ of signal of the objective pixel is given, by using, with respect to the position of the objective pixel, a signal $x_{Hf}$ of one-preceding pixel and a signal $x_{Hb}$ of one-following pixel in the horizontal direction, and a signal of $x_{Vf}$ of one-upper pixel and a signal of $x_{Vb}$ of one lower pixel in the vertical direction, obtaining as:

$$\hat{x} = \tfrac{1}{4}\{a_H(x_{Hf} + x_{Hb}) + a_V(x_{Vf} + x_{Vb})\},$$

$$\left(\begin{array}{l}\text{wherein } a_H, a_V \text{ are prediction coefficients in the horizontal and vertical directions, respectively.}\end{array}\right)$$

Average prediction error power $\overline{\epsilon_4^2}$ becomes $$\epsilon_4^2 = \sigma^2 \left( \frac{5}{4} - (\rho_H + \rho_V) + \tfrac{1}{4}(\rho_H^2 + \rho_V^2 + 4\rho_H \cdot \rho_V) \right) \quad (5)$$

($\rho_H$, $\rho_V$ are correlation coefficients of horizontal direction and vertical direction, respectively).

Provided that $\rho_H = \rho_V = \rho_f = \rho_b = \rho$, equations (2), (3) and (5) are compared. When $\rho \approx 1$, $$\left.\begin{array}{l}\overline{\epsilon_1^2} = 2\sigma^2(1 - \rho) \\ \overline{\epsilon_2^2} \approx \sigma^2(1 - \rho) \\ \overline{\epsilon_4^2} \approx \tfrac{1}{2}\sigma^2(1 - \rho)\end{array}\right\} \quad (6)$$

and it is understood that average prediction error power becomes small when average of four points are made. Accordingly, by detecting the level of correlation by the correlation circuit 17, the switching is made so as to make the average prediction error power a minumum. With respect to the correlations $\rho_V$ and $\rho_H$, the average of larger signal of either one of the correlation $\rho_H^2$ of A and a D and correlation $\rho_V^2$ of "a" and "d" are taken as the pixel signal, and calculation is made thereby. When an average prediction is better than plane prediction as $\overline{\epsilon_4} > \overline{\epsilon_2}$, the similar correction as in the first embodiment is to be made by utilizing the upper or lower value or left or right value thereof.

As mentioned above, in the second embodiment of the present invention, by using a delay line of a horizontal scanning time, predicted error generated by correction of the failure is powered to a smaller level, thereby improving production yield due to failure of solid state imaging device, and thereby can decrease cost of imaging device using the solid state imaging device.

Incidentally, though in this embodiment, average prediction error power is used to switch signals of an objective pixel to another signal, as other way also by using relation of level of signals of pixels around an objective pixel, the prediction error can be decreased.

Figure 9:
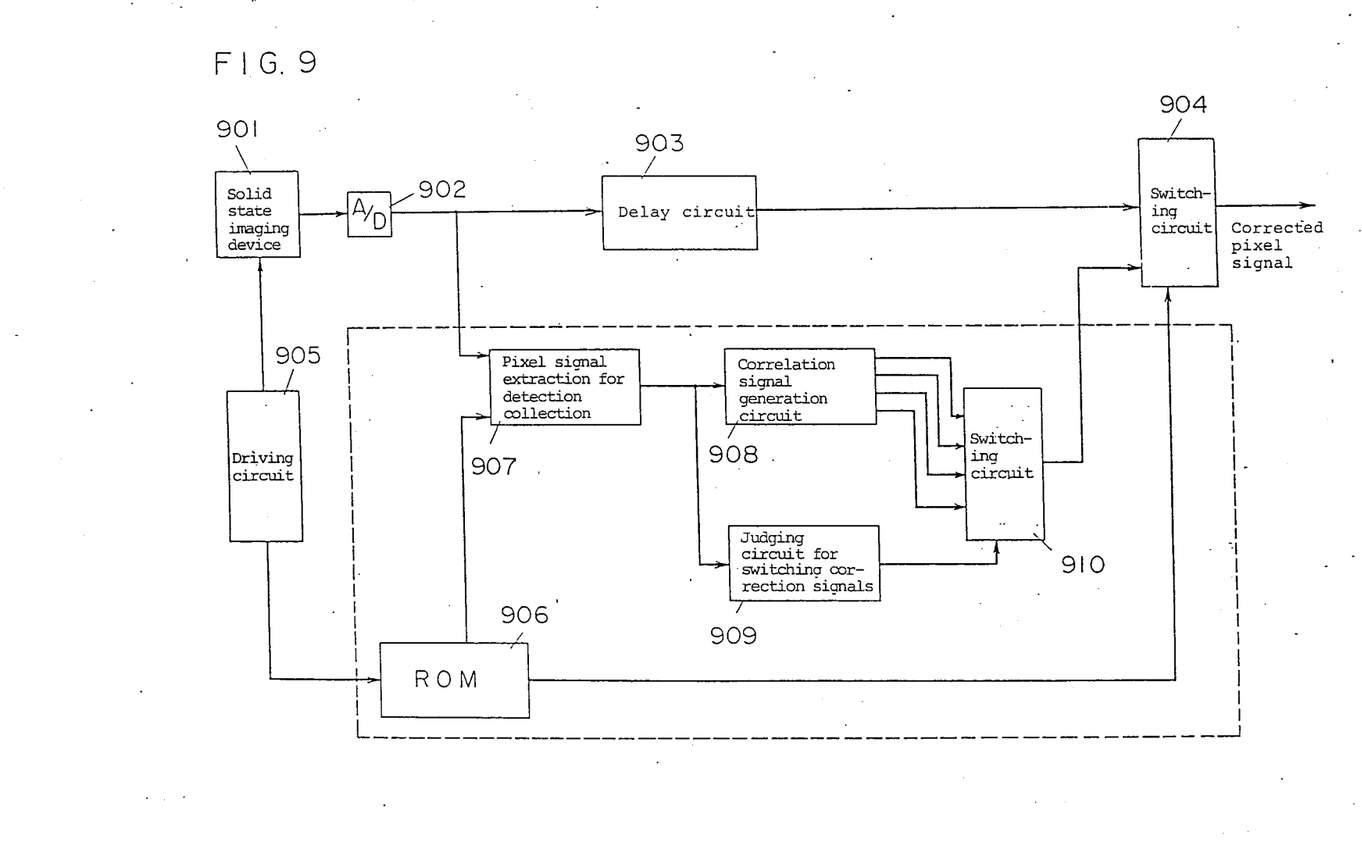
FIG. 9 is a block diagram showing a third embodiment of defect correction apparatus in accordance with the present invention.

FIG. 9 shows a block diagram of a failure correction apparatus in accordance with a third embodiment of the present invention. In FIG. 9, 901 is a solid state imaging device, 902 is an A/D converter, 903 is a delay circuit, 904 and 910 are switching circuits, 905 is a driving circuit, 906 is a read only memory (hereafter ROM), 907 is a pixel signal extraction circuit of pixel signal for detection correction, 908 is a correction signal generation circuit and 909 is a signal judging circuit of correction signal.

The operation of the defect correction apparatus of the present embodiment constituted as above, is elucidated as follows.

The pixel signal taken out from the solid state imaging device 901 to be controlled by the driving circuit 905 is converted by the A/D converter 902 to digital signal. When failure signal is included in the digital pixel signal, the preceding and following pixel signals of the failure signal are taken out by using the ROM 906 and the pixel signal extraction circuit for detection correction 907. These pixel signals are inputted to the correction signal generation circuit 908 and switching judging circuit for correction signal 909, and correction pixel signal is produced through the switching circuit 910.

The original failure signal coming through the delay circuit 903 is switched to the correction pixel signal by the switching circuit 904, to produce the corrected pixel signal as an output. Since the position of the failure pixels are already known, by storing them in the ROM 906, the pixel signal for detection correction can be easily extracted.

Figure 5:
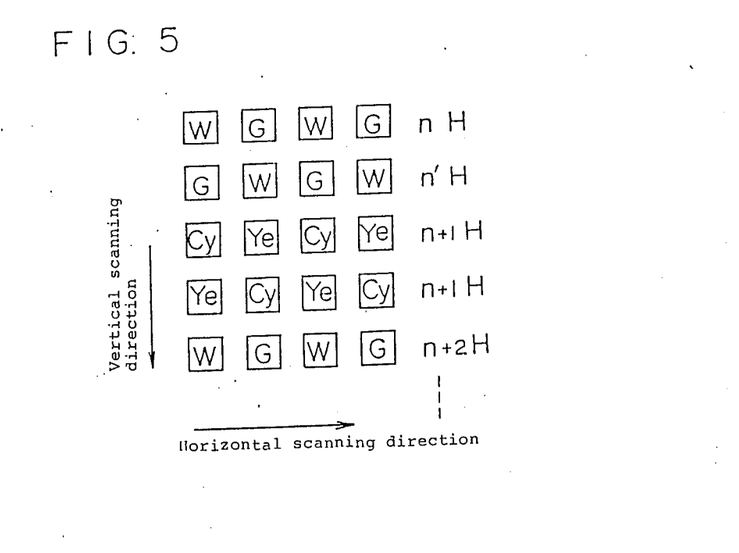
FIG. 5 is a drawing showing color filter arrangement in one embodiment of the present invention.
Figure 10:
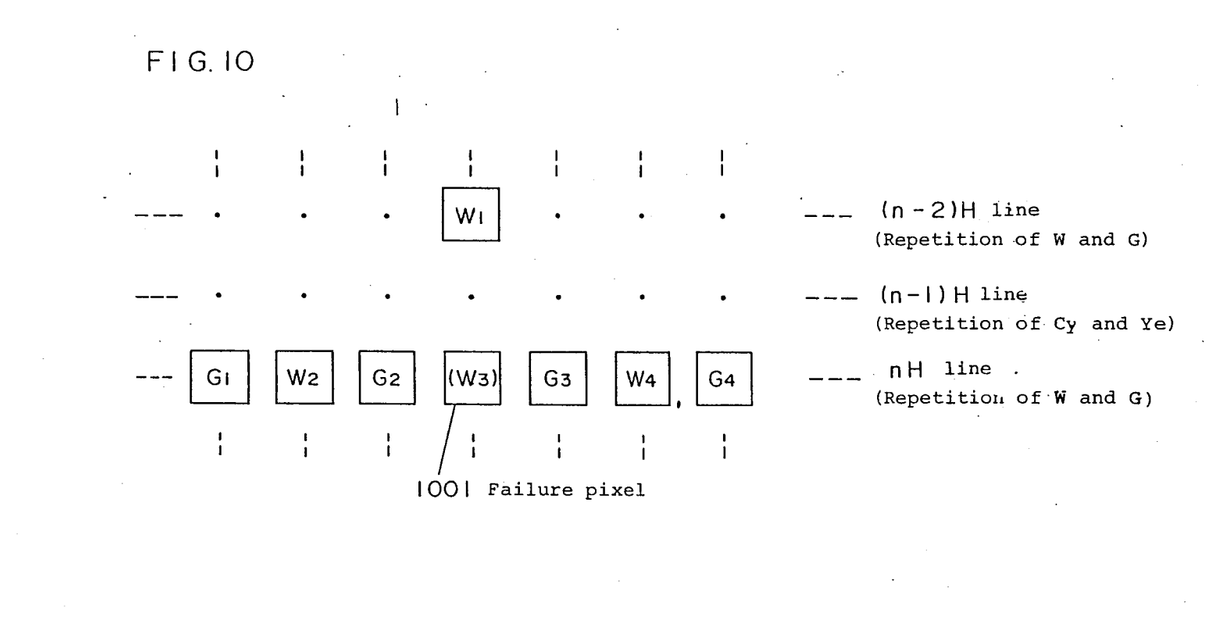
FIG. 10 is a drawing showing example of color filter arrangement of a solid state imaging device.

For instance, similarly to FIG. 5, in a solid state imaging device having repetition of color filter arrangement as shown in FIG. 10, it is provided that a pixel 1001 on nH line is a failure pixel. As pixel signals to correct the failure pixel signal $W_3$ 1001, there are two pixel signals $W_2$ and $W_4$ on both side thereof and the average signal $(W_2 + W_4)/2$ thereof and further a pixel signal $W_1$ which is on $(n-2)H$ line and immediately on the failure pixel 1001. Since the $(n-1)H$ line is pixel signals of repetition of Cy and Ye, it is not used as the correction signal for the failure pixel signal $W_3$ 1001.

Furthermore, a judging signal for selecting the optimum signal among the above-mentioned four correction signals is made from the pixel signals $G_1$, $G_2$, $G_3$ and $G_4$ of FIG. 19. That is, in order to grasp signal changes of the prior to and after the failure pixel signal $W_3$, two difference signals $G_2 - G_1$ and $G_3 - G_4$ are made.

In the above, as the pixel signal for detection correction, it is necessary to take out seven signals of $W_1$, $G_1$, $W_2$, $G_2$, $G_3$, $W_4$ and $G_4$.

Figure 11:
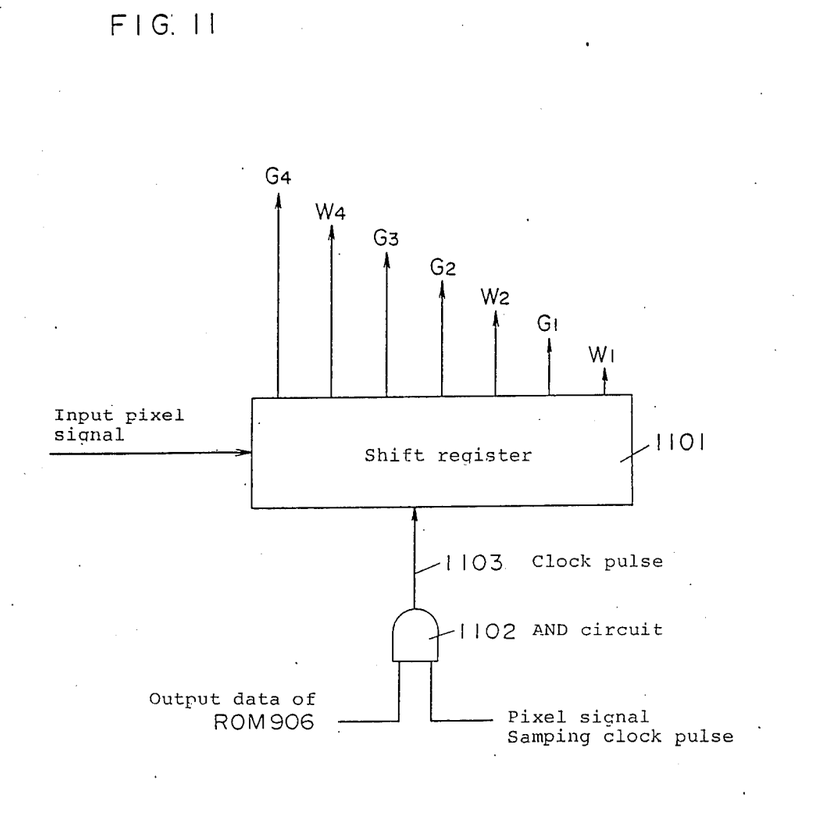
FIG. 11 is a constitution drawing of a pixel signal extraction circuit for detection and correction.

FIG. 11 is a constitution diagram of pixel signal extraction circuit for detection correction 907 for taking out the seven signals. 1101 is a one-input seven-output shift register. Output data of ROM 906, sequential sampling clock pulse of pixel signal and clock pulse 1103 impressed on the shift register 1101 are shown by $(a)$, $(b)$ and $(c)$ of FIG. 12, respectively.

The pixel signal is input to the shift register 1101, and the clock pulse 1103 to control the latter is the signal made by output data (a) of ROM 906 and sequential sampling pulse of pixel signal (b) via the AND circuit 1102.

Figure 12:
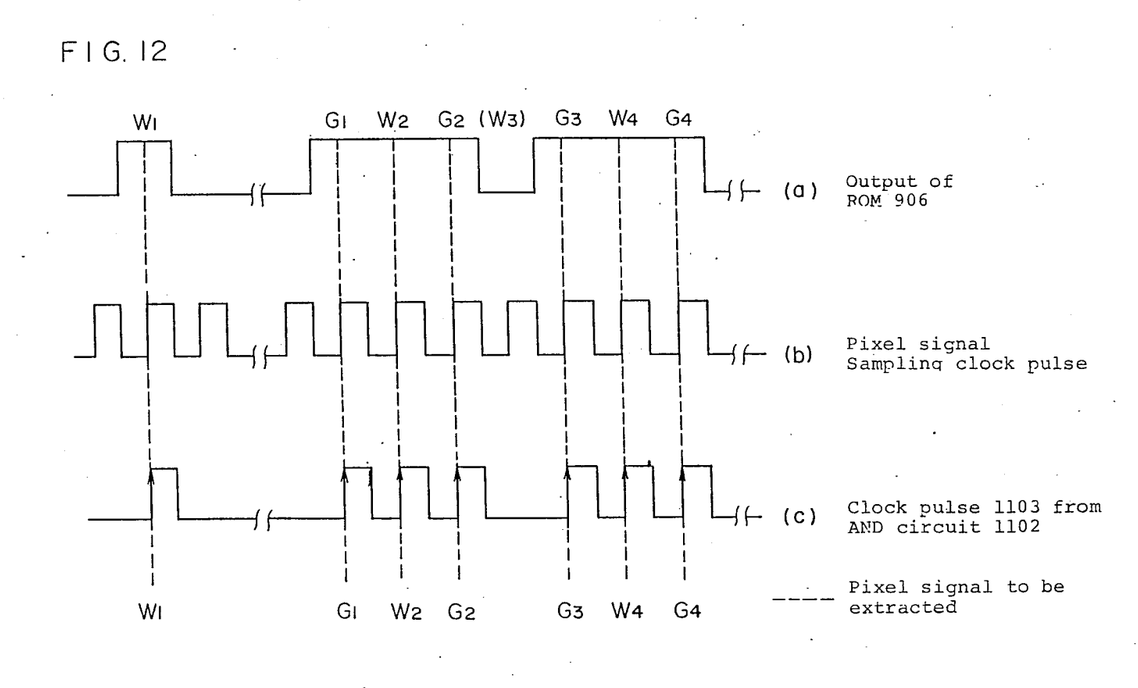
FIG. 12 is a timing chart of clock pulses in FIG. 11.

Accordingly, as is understood from FIG. 12(c), the signal taken in to the shift register 1101 is the seven pixel signals $W_1$, $G_1$, $W_2$, $G_2$, $G_3$, $W_4$ and $G_4$. Since the seven signals are parallelly output to the shift register 1101, it means that desired pixel signals are extracted.

Figure 13:
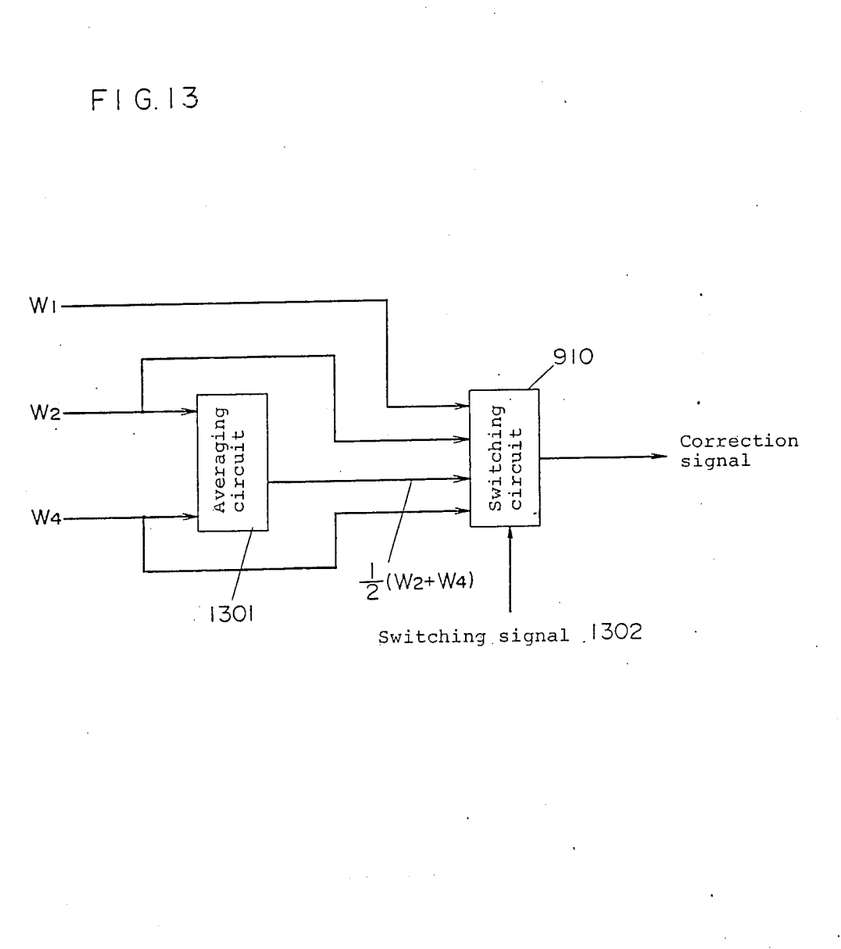
FIG. 13 is a constitution drawing of a correction signal generation circuit and switching circuit.

FIG. 13 is a constitution drawing of the correction signal generation circuit 908 and switching circuit 910. Since $W_1$, $W_2$ and $W_4$ among the correction signals are already extracted pixel signals itself, it is enough to make an average signal $(W_2+W_4)/2$ only by inputting $W_2$ and $W_4$ to the averaging circuit 1301.

Figure 14:
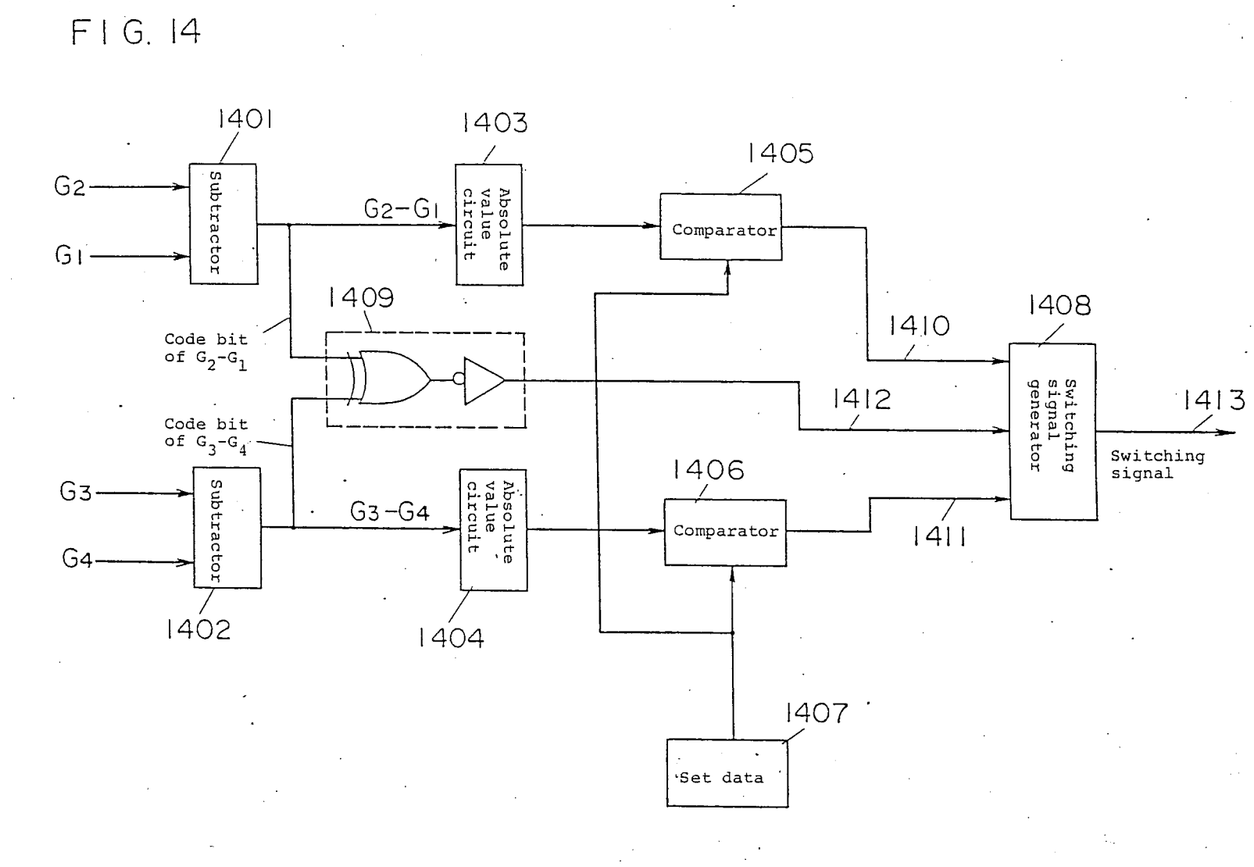
FIG. 14 is a constitution drawing of a judging circuit of correction signal.

Switching circuit 1302 to select among these four correction signals is produced by FIG. 14. FIG. 14 is a block diagram of switching judging circuit of correction signal 909.

Among correction signals taken out by the pixel signal extraction circuit for detection correction 907, four pixel signals $G_1$, $G_2$, $G_3$ and $G_4$ are used. By making difference signals $G_2-G_1$ and $G_3-G_4$ by the subtractors 1401 and 1402, and by the absolute value circuits 1403 and 1404, absolute values $|G_2-G_1|$ and $|G_3-G_4|$ are produced.

Then these two values are compared with the set data 1407 by the comparators 1405 and 1406, and when it is larger than the set data 1407 "H" is, and in the contrary case "L" is issued, respectively. And, for cord bits of the difference signals $G_2-G_1$ and $G_3-G_4$, by passing through a circuit of EXCLUSIVE-OR and NOT 1409, when two difference signals are of the same codes "H" is, and when they are of different codes "L" is issued, respectively.

Output signals 1410 and 1411 from the comparators 1405 and 1406 as well as the signal 1412 from the EXCLUSIVE-OR and NOT circuit 1409 is input to the switching signal generation circuit 1408, to produce switching signal 1413 for optimum correction signal.

The judging table is as shown in TABLE 1.

TABLE 1

| Code bit judging signal 1412 | Output signal 1410 from comparator | Output signal 1411 from comparator 1406 | Signal of substitution for optimum correction 1405 |
|---|---|---|---|
| "X" | "L" | "H" | $W_2$ |
| "X" | "H" | "L" | $W_4$ |
| "X" | "L" | "L" | $\frac{1}{2}(W_2 + W_4)$ |
| "L" | "H" | "H" | $\frac{1}{2}(W_2 + W_4)$ |
| "H" | "H" | "H" | $W_1$ |

Where "X" shows that it may be either "L" or "H".

Figure 15:
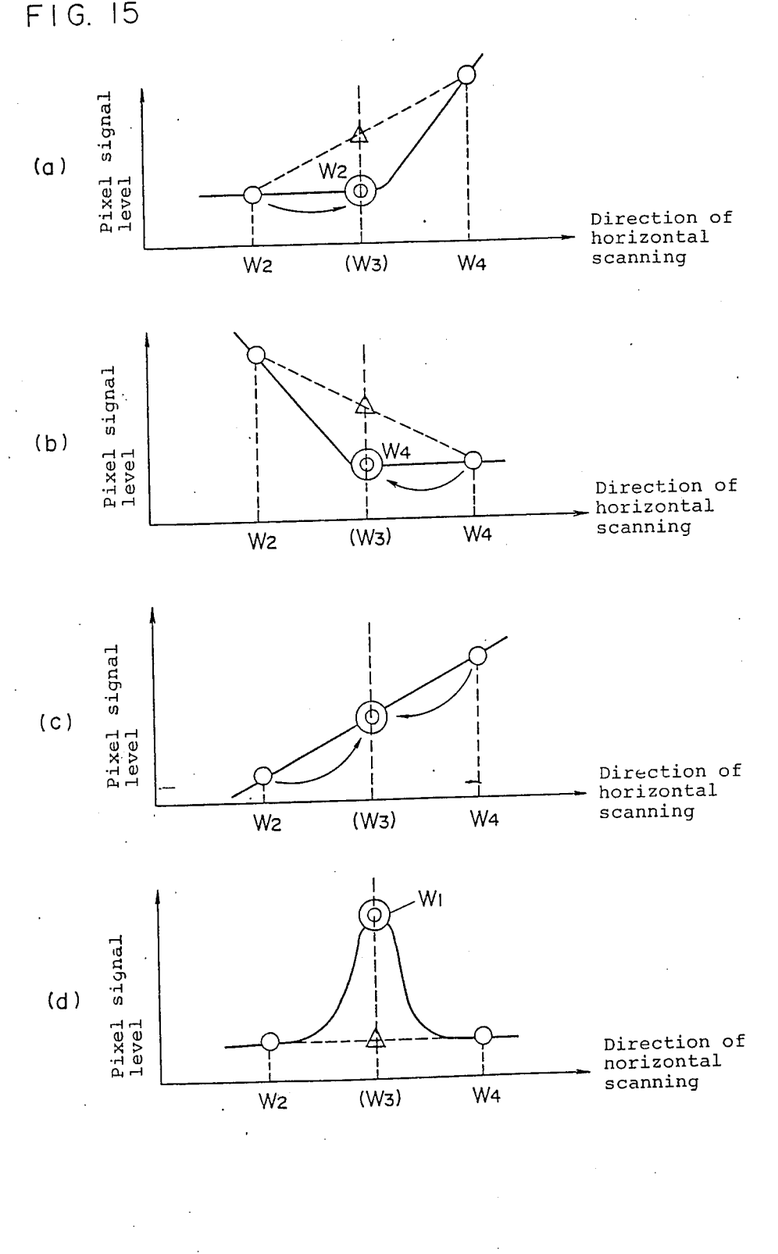
FIGS. 15a–15d is a drawing showing pixel signal levels before and after the failure pixel.

FIG. 15 shows levels of pixel signals of the preceding and following the failure pixel signal $W_3$ corresponding to the substitution signal to be selected.

(a) of the same figure shows a case where $|G_2-G_1|$ is smaller than the set data 1407 $|G_3-G_4|$ is larger than the set data 1407, and the failure pixel is substituted by the pixel signal $W_2$ of the preceding one. Also, in (b) of the same figure is in the case where $|G_2-G_1|$ is larger than the set data 1407 and $|G_3-G_4|$ is smaller than the set data 1407, and the failure pixel of this case is substituted by the following pixel signal $W_4$.

In (a) and (b) of the same drawing, it is clear that the optimum substitution pixel signals are respectively $W_2$ nd $W_4$. If both ones are substituted by the average value signal $(W_2+W_4)/2$ of $W_2$ and $W_4$, the pixel signal level is set at the part of $\Delta$-marked part, and error becomes large.

In the same figure (c) is the case when absolute value $|G_2-G_1|$ and $|G_3-G_4|$ are both smaller than the set data 1407, or both larger than it, and further the difference signals are of different codes, and the failure pixel is substituted by an average value of $W_2$ and $W_4$, namely $(W_2+W_4)/2$.

The same figure (d) is the case when both sides of the failure pixel are edges, and on the image, for instance, fine white line exist in vertical scanning direction.

In this case, even the case is of the preceding or following pixel signals and substituted by the failure pixel signals or by average value signal thereof, error from the pixel signal $W_3$ which is originally required is very large. Therefore, when the substitution is made with the pixel signal $W_1$ which is nearest in vertical scanning direction, the error becomes eliminated.

Condition of the above is as shown in TABLE 1 that absolute values $|G_2-G_1|$ and $|G_3-G_4|$ of the difference signals are both larger than the set data 1407, and that the difference signals are of the same codes. But since such case as the same FIGURE (d) only rarely occurs in ordinary object, only by making the substitution of three cases of the same figures (a), (b) and (c), the effect of the defect correction is enough and the picture quality is very much improved.

At that time, since the pixel signals for defection correction becomes six, the size of circuit of the defect correction apparatus becomes further small.

The third embodiment of the present invention as described above relates to the defect correction apparatus.

Signals obtained from the pixels of the solid state imaging device are fixed as shown in FIG. 10. The signal from the pixel $W_1$ is set as Sl, the signal from the pixel $G_1$ is set as $S_{m-k}, \ldots$, and the signal from the pixel $G_4$ is set as $S_{m+k}$.

That is, the third embodiment concretely elucidates a defect correction apparatus wherein, a signal $S_m$ from the m-th pixel on a n-th horizontal line (hereafter referred to as nH line; n is a natural number) taken out from a solid state imaging device is substituted by a signal $S_{m-j}$ from the $m-j$-th pixel when absolute value $|S_{m-i} S_{m-k}|$ of a difference signal between a signal $S_{m-k}$ from the $m-k$-th pixel and a signal $S_{m-i}$ from the $m-i$-th pixel (i and k are natural numbers, and $i<j<m$) is smaller than a certain value A, and absolute value $|S_{m+i}-S_{m+k}|$ of a difference signal between k-th pixel signal $S_k$ and a signal $S_{m+k}$ from the $m+k$-th pixel, the same is substituted by a signal $S_{m+j}$ from the $m+j$-th pixel when the $|S_{m-i}-S_{m-k}|$ is larger than A and $S_{m+i}-S_{m+k}$ is smaller athan A, the same is substituted by the signal Sl from the l-th pixel (l is a natural number) of $(n-h)H$ line (h is a natural number, $h<n$) when $|S_j-S_i|$ and $|S_{m+i}-S_{m+k}|$ are both larger than A, and a product $(S_{m-i}-S_{m-k}) \times (S_{m+i}-S_{m+k})$ of the valaues $S_{m-i}-S_{m-k}$, a value of subtracting $S_{m-k}$ from $S_j$ and $S_{m+i}-S_{m+k}$, a value of subtracting $S_{m+k}$ from $S_{m+i}$ is positive, and the same is substituted by an average value $(S_{m-j}+S_{m+j})$ of $S_{m-j}$ and $S_{m+j}$ when the case is other than the above-mentioned.

And, an embodiment wherein the case of FIG. 15(d) is not considered becomes the pixel defect correction apparatus.

Incidentally, in this embodiment the elucidation is made under a premise that color filter arrangement of the solid state imaging device is such as shown in FIG. 10, but, needless to say, it is applicable in other filter arrangement.

Especially, in the case of a pixel defect correction apparatus of white and black in which no color filter is used on the front surface, it is obvious that since correlation operation can be made by using signals of immediately neighboring pixels, high correlation is obtainable and hence better result is obtainable.

Furthermore, with respect to the pixel signals to be used for the correlation operation, not only the pixel signals of horizontal and vertical directions with respect to the failure pixel, it is possible to use the pixel signals of oblique directions.

According to the present invention, since it is constituted that responding to the picture images picked up, for the position of failure-containing pixel, the best one among plural signals produced by pixels surrounding that pixel are used being switched, it is possible to compensate the failure pixel signal by the suitable signal to surround it; thereby continuity with, harmonization with and uniformity as a picture image with the surrounding one is realizable; and it is possible to obtain a high quality picture signal as if there are no defects.

We claim:

1. A defect correction apparatus, comprising:
   a memory including information indicative of an image failure of a solid state imaging device;
   means for correcting a signal of a failure pixel based on said information indicative of image failure, by using the signals of pixels thereraround, by producing plural different signals, said plural different signals being indicative of plural pixels which are around said failure pixel;
   means for selecting only one signal from said plural different signals; and
   means for substituting said one signal for said failure pixel signal at the position of said failure pixel, wherein said selecting of only one signal from plural different signals is made by utilizing a largeness relation among said plural different signals.

2. A defect correction apparatus, comprising:
   a memory including information indicative of an image failure of a solid state imaging device;
   means for correcting a signal of a failure pixel based on said information indicative of image failure, by using signals of pixels thereraround, by producing plural different signals, said plural different signals being indicative of plural pixels which are around said failure pixel;
   means for selecting only one signal from said plural different signals; and
   means for substituting said one signal for said failure pixel signal at the position of said failure pixel, wherein said selecting of only one signal from said plural different signals is made by utilizing an average predictive error power among said plural different signals.

3. A defect correction apparatus, comprising:
   means for obtaining pixel signals; and
   means for substituting for an m-th pixel signal $S_m$ where m is a natural number taken out from a solid state imaging device:
   (1) by a p-th pixel signal $S_p$, when an absolute value $|S_j-S_i|$ of a difference signal between an $S_i$ signal of an i-th pixel signal, and an $S_j$ signal of a j-th pixel signal, where i and j are natural numbers and $i<j<m$, is smaller than a certain value A and an absolute value $|S_k-S_l|$ of a difference signal between a $S_k$ signal of a k-th pixel signal and an Sl signal of an l-th pixel signal, where k and l are natural numbers and $m<k<l$, i larger than said A, and
   (2) by a q-th pixel signal $S_q$ when $|S_j-S_i|$ is larger than said A and $|S_k-S_l|$ is smaller than said A, and
   (3) by an average value $S_{pq}$ of said p-th pixel signal and said q-th pixel signal, in other cases than said (1) and (2) functions.

4. A defect correction apparatus comprising:
   means for obtaining pixel signals; and
   means for substituting for an m-th pixel signal $S_m$, on an n-th horizontal line, where n is a natural number, taken out from a solid state imaging device:
   (1) by $S_p$ when $|S_j-S_i|$ is smaller than A, and $|S_k-S_l|$ is larger than said A, where $S_i$ is a signal of an i-th pixel, $S_j$ is a signal of a j-th pixel, where i and j are natural numbers and $i<j<m>$, and A is a predetermined value,
   (2) by $S_q$ when $|S_j-S_i|$ is larger than said A and $|S_k-S_l|$ is smaller than said A, where $S_k$ is a signal of a k-th pixel and $S_l$ is a signal of an l-th pixel signal, where k and l are natural numbers and $m<k<l$,
   (3) by an r-th pixel signal, $S_r$, where r is a ntural number, on an (n−h) th horizontal line, where h is a natural number and $h<n$, when both of $|S_j-S_i|$ and $|S_k-S_l|$ are larger than A, and a product $(S_j-S_i)\cdot(S_k-S_l)$, which is a product of $S_j$ and $S_k-Sl$, made by subtracting $S_i$ from $S_j-S_i$, made by subtracting $S_l$ from $S_k$, is positive, and
   (4) by an average value $S_{p,q}$ of $S_p$ and $S_q$ when the case is other than the above-mentioned.

5. A pixel defect correction apparatus for correcting a signal of an object pixel in a solid state imaging device, comprising:
   means for producing plural correction signals using direct signals, and an average signal of said direct signals, said direct signals being produced from one of:
   (A) right and left pixels in a horizontal direction relative to said object pixel;
   (B) right and left pixels in said horizontal direction, and above and below pixels in a vertical direction relative to said object pixel, and
   (C) right and left pixels in said horizontal direction, above and below pixels in said vertical direction and obliquely above to below pixels in oblique directions relative to said object pixel; and
   means for selecting one substitution signal from said plural correction signals by utilizing a largeness relation among said plural correction signals.

6. An Apparatus as in claim 5 further comprising means for using said substitution signal in place of said signal of an object pixel.

7. A pixel defect correction apparatus in accordance with claim 6, wherein
   said object pixel is an m-th pixel, where m is a natural number and represents a position in the horizontal direction, and a substitution signal Sn from said object pixel is selected,
   a signal $S_{m-j}$ ($i \leq j \leq k$) from an (m−j)-th pixel when an absolute value $|S_{m-i}-S_{m-k}|$ of a difference signal between a signals $S_{(m-k)}$ from an (m−k)−th pixel and a signal $S_{(m-i)}$ from an (m−i)-th pixel, where i and k are natural numbers and $i<k$, $1<i<10$, $1<k<10$, said difference being smaller than a certain value A and an absolute value $|S_{m+i}-S_{m+k}|$ of a difference signal between a signal $S_{(m+i)}$ from the m+i-th pixel and a signal $S_{m+k}$ from an (m+k)th pixel is larger than said A a signal $S_{m+j}$ from the m+j-th pixel when $|S_{m-i}-S_{m-k}|$ is larger than said A and $|S_{m+i}+S_{m+k}|$ is smaller than said A, and an average value $(S_{m-j}+S_{m+j})/2$ in other cases than the above-mentioned.

8. A pixel defect correction apparatus in accordance with claim 6, wherein said object pixel is an m-th pixel, where m is a natural number, said object pixel being disposed at an m-th position in a horizontal direction, and a substitutional signal from said object pixel is selected as:, (a) a signal $S_{(m-j)}$ ($i \leq j \leq k$) from an (m−j)-th pixel when an absolute value $|S_{m-i}-S_{m-k}|$ of a difference signal between a signal $S_{(m-k)}$ from an (m−k)-th pixel and a signal $S_{(m-i)}$ from an (m−i)-th pixel where i and k are natural numbers and i<k, 0<i<10) is smaller than a certain value A and an absolute value $|S_{m+i}-S_{m+k}|$ of a difference signal between a signal $S_{(m+i)}$ from an (m+i)-th pixel and a signal $S_{(m+k)}$ from an (m+k)-th pixel is larger than said A, (b) a signal $S_{m+j}$ from an (m+j)-th pixel when $|S_{m-i}-S_{m-k}|$ is larger than said A and $|S_{m+i}-S_{m+k}|$ is smaller than said A, (c) a signal $S_l$ from the l-th pixel which is disposed l scanning lines before said object pixel where l is a natural number and 0<l<10) when $|S_{m-i}-S_{m-k}|$ and $|S_{m+i}-S_{m+k}|$ are both larger than said A, and a product $(S_{m-i}-S_{m-k}) \times (S_{m+i}-S_{m+k})$ of values $S_{(m-i)}-S_{(m-k)}$, a value of subtracting $S_{m-k}$ from $S_{m-i}$ and $S_{m-i}-S_{m+k}$, a value of subtracting $S_{m+k}$ from $S_{m+i}$ is positive, and (d) an average value $(S_{m-j}+S_{m+j})/2$ in other cases than (a)-(c).

9. A pixel defect correction apparatus for correcting a signal of an object pixel in a solid imaging device, comprising:

means for producing plural correction signals using direct signals, and an average signal of said direct signals, said direct signals being produced from one of:

(A) right and left pixels in a horizontal direction relative to said object pixel, (B) right and left pixels in said horizontal direction, and above and below pixels in a vertical direction relative to said object pixel, and (C) right and left pixels in said horizontal direction, above and below pixels in said vertical direction and obliquely above to below pixels in oblique directions relative to said object pixel, and means for selecting only one substitution signal from said plural correction signals by utilizing an average predictive error power among said plural correction signals.

10. An apparatus as in claim 9 further comprising means for using said substitution signal in place of said signal of an object pixel.

11. A pixel defect correction apparatus in accordance with claim 10, wherein said object pixel is an m-th pixel, where m is a natural number and represents a position in the horizontal direction, and a substitution signal Sn from said object pixel is selected, a signal $S_{m-j}$ ($i \leq j \leq k$) from an (m−j)-th pixel when an absolute value $|S_{m-i}-S_{m-k}|$ of a difference signal between ≤ a signal $S_{(m-k)}$ from an (m−k)-th pixel and a signal $S_{(m-i)}$ from an (m−i)-th pixel, where i and k are natural numbers and i<k, 1<i<10, 1<k<10, said difference being smaller than a certain value A and an absolute value $|S_{m+i}-S_{m+k}|$ of a difference signal between a signal $S_{(m+i)}$ from the m+i-th pixel and a signal $S_{m+k}$ from an (m+k)th pixel is larger than said A a signal $S_{m+j}$ from the m+j-th pixel when $|S_{m-i}-S_{m-k}|$ is larger than said A and $|S_{m+i}+S_{m+k}|$ is smaller than said A, and an average value $(S_{m-j}+S_{m+j})/2$ in other cases than the above-mentioned.

12. A pixel defect correction apparatus in accordance with claim 6, wherein said object pixel is an m-th pixel, where m is a natural number, said object pixel being disposed at an m-th position in a horizontal direction, and a substitutional signal from said object pixel is selected as:, (a) a signal $S_{(m-j)}$ ($i \leq j \leq k$) from an (m−j)-th pixel when an absolute value $|S_{m-i}-S_{m-k}|$ of a difference signal between a signal $S_{(m-k)}$ from an (m−k)-th pixel and a signal $S_{(m-i)}$ from an (m−i)-th pixel where i and k are natural numbers and i<k, 0<i<10) is smaller than a certain value A and an absolute value $|S_{m+i}-S_{m+k}|$ of a difference signal between a signal $S_{(m+i)}$ from an (m+i)-th pixel and a signal $S_{(m+k)}$ from an (m+k)-th pixel is larger than said A, (b) a signal $S_{m+j}$ from an (m+j)-th pixel when $|S_{m-i}-S_{m-k}|$ is larger than said A and $|S_{m+i}-S_{m+k}|$ is smaller than said A, (c) a signal $S_l$ from the l-th pixel which is disposed l scanning lines before said object pixel where l is a natural number and 0<l<10) when $|S_{m-i}-S_{m-k}|$ and $|S_{m+i}-S_{m+k}|$ are both larger than said A, and a product $(S_{m-i}-S_{m-k}) \times (S_{m+i}-S_{m+k})$ of values $S_{(m-i)}-S_{(m-k)}$, a value of subtracting $S_{m-k}$ from $S_{m-i}$ and $S_{m-i}-S_{m+k}$, a value of subtracting $S_{m+k}$ from $S_{m+i}$ is positive, and (d) an average value $(S_{m-j}+S_{m+j})/2$ in other cases than (a)-(c).

* * * * *